United States Patent [19]

Aagaard

[11] 4,164,632

[45] Aug. 14, 1979

[54] SIGNALLING SYSTEM FOR OVERVOLTAGE PROTECTORS

[75] Inventor: Einar A. Aagaard, Eindhoven, Netherlands

[73] Assignee: U.S. Philips Corporation, New York, N.Y.

[21] Appl. No.: 857,775

[22] Filed: Dec. 5, 1977

[30] Foreign Application Priority Data

Dec. 17, 1976 [NL] Netherlands ............... 7614000

[51] Int. Cl.² ........................................... H04B 3/46
[52] U.S. Cl. ........................................... 179/175.3 R
[58] Field of Search ..... 179/175.3 R, 1 MN, 175.2 R, 179/175, 175.25, 175.3 F, 78 A; 340/638, 639, 650–652; 361/45, 60, 63, 64, 78, 80, 81

[56] References Cited

U.S. PATENT DOCUMENTS

| | | | |
|---|---|---|---|
| 3,573,780 | 4/1971 | Butterbaugh | 340/652 |
| 3,812,303 | 5/1974 | Stewart | 179/175.3 R |
| 3,821,495 | 6/1974 | Duff | 179/175.3 R |
| 3,852,541 | 12/1974 | Altenberger | 179/175.3 R |
| 3,959,605 | 5/1976 | Jurschak | 179/175.3 R |
| 4,024,360 | 5/1977 | Biraghi et al. | 179/175.3 R |
| 4,037,220 | 7/1977 | Beyersdorf | 340/652 |

*Primary Examiner*—Kathleen H. Claffy
*Assistant Examiner*—Gerald L. Brigance
*Attorney, Agent, or Firm*—Thomas A. Briody; William J. Streeter; William J. Streeter

[57] ABSTRACT

A system for signalling the fact that the fuses and limiting diodes in the connecting circuits of telephone lines are defective. Use is made of the rest supply resistors already present in the connecting circuits and the loop detector which is normally used for detecting calls. The fuses and limiting diodes are connected in such a way that a defect causes the loop detector, which is constructed as a differential voltage detector, to signal a call.

3 Claims, 4 Drawing Figures

SIGNALLING SYSTEM FOR OVERVOLTAGE PROTECTORS

BACKGROUND OF THE INVENTION

(1) Field of the Invention

The invention relates to a system for signalling that overvoltage protecting means in the connecting circuits of telephone lines which are connected to the central battery through rest supply resistors and to a loop detector for detecting the state of the subscriber's loop and to switching means for connecting the telephone line to a feeding bridge are not intact.

It is necessary to protect telephone lines which are connected to telephone exchanges from overvoltages. Various means are known for this purpose inter alia fuses and clamping diodes are used.

In addition it is necessary to check that the fuses and the diode protection are intact.

(2) Description of the Prior Art

French Patent No. 2,223,918 discloses a system for detecting the interruption of a fuse in a telephone line to which a detector for false calls is added.

In this known system the fuse is constructed such that after excitation a short-circuit is formed between the wires of the telephone line. This short-circuit can be detected by means of the detector for false calls.

SUMMARY OF THE INVENTION

Fuses which, owing to their special construction can indicate that they are excited, that is to say that they have performed their protective function, are expensive.

It is an object of the invention to provide a signalling system which does not depend on a special construction of the overvoltage protector.

Therefore the system according to the invention is characterized in that the overvoltage protection means are connected into the circuit which passes from the battery terminals through the rest supply resistors to the input of the loop detector which is constructed as a differential voltage detector, whereby the differential voltage detector will detect a closed loop (call), if, due to the fact that an overvoltage protection means is not intact the difference voltage at the input of the difference voltage detector decreases.

In this manner the alternate detection of a call and an interruption results in an indication of the fact that the overvoltage protector is no longer intact.

DESCRIPTION OF THE EMBODIMENTS

Figure 1:
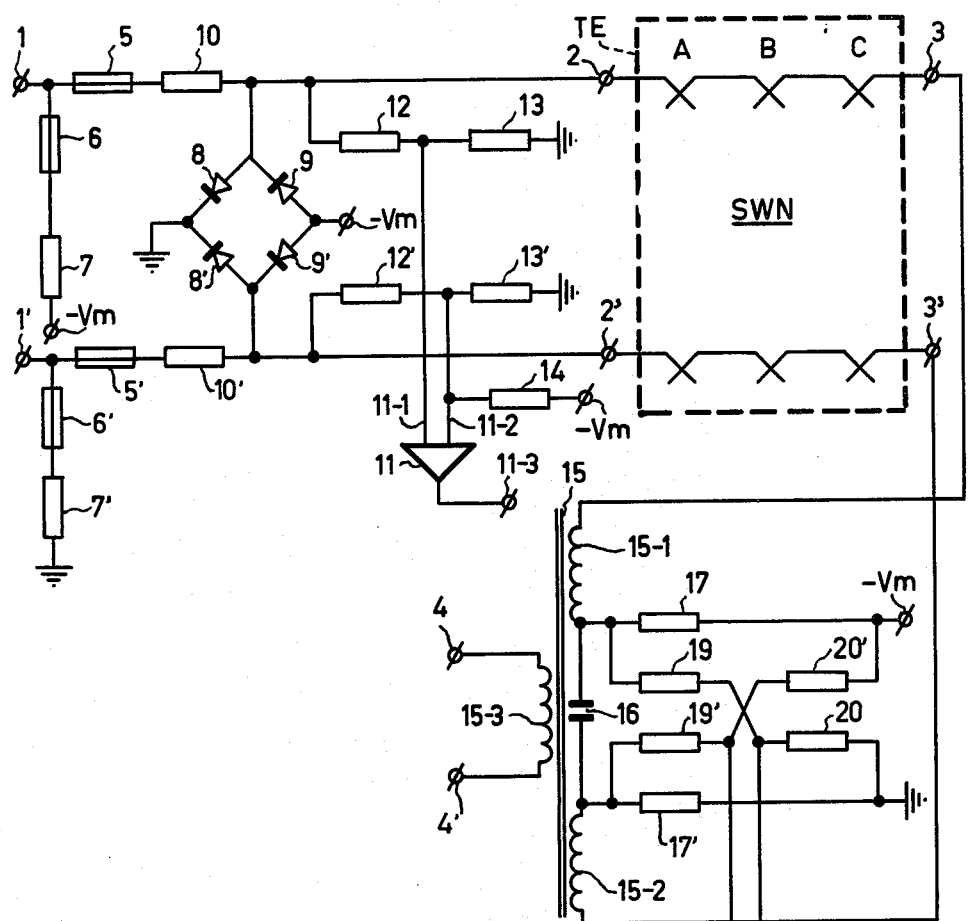
FIG. 1 is a diagram of a system according to the invention.

In the FIGS. 1, 2, 3 and 4 1-1' indicate the input terminals and 2-2' the output terminals of a connecting circuit for a subscriber's line whose wires a and b can be connected to the terminals 1-1'.

The terminals 1-1' are located at the subscriber's side and the output terminals 2-2' are located at the exchange side of the circuit.

The telephone exchange TE comprises a switching network SWN having a plurality of switching stages A, B and C by means of which the terminals 2-2' of the connecting circuit can be connected to the input terminals 3-3' of a supply bridge, whose output terminals are indicated by 4-4'. the central battery.

References 5 and 5' and 6 and 6' indicate fuses in the range from 1 Amp to 100 mA.

The fuses 5 and 5' are connected in the wires of the telephone line. The fuses 6 and 6' are connected in the circuit which connects the telephone line through the high-ohmic quiescent-supply resistors 7 and 7' to the central battery. Depending on the protection desired these last-mentioned fuses may possibly be omitted. However, no additional means are required to signal whether these fuses are intact.

By means of the diodes 8 and 8' and 9 and 9' overvoltages are clamped to and on the battery voltage $-Vm$.

The resistors 10 and 10' connected in the wires of the telephone line limit the current during the occurrence of the overvoltages. These resistors may have a value of approximately 10 to 20 ohms.

Reference 11 indicates a differential voltage amplifier whose input terminals 11-1 and 11-2 are connected through the resistors 12 and 13 and 12' and 13' to the wires of the telephone line. The high-ohmic resistors 12 and 13 and 12' and 13' are only used to bring the voltages of the wires within the operating range of amplifier 11 by means of voltage division.

If the subscriber closes the loop across the subscriber's line a change will be produced in the input voltage of amplifier 11.

By adapting resistor 14 such a setting of input 11-2 can be obtained that at the transition from an open to closed subscriber's loop the polarity of the input voltage of amplifier 11 reverses. It is then possible to use an operational amplifier in the form of a polarity detector. A change in the state of the subscriber's line is signalled at the output 11-3 of loop detector 11 by a change in the signal level.

It is customary to specify the closed-loop state by call and the open-loop state by interrupt.

In the case of a call control devices in the telephone exchange become operative which connect the terminals 2-2' of the connecting circuit through the switching network SWN to the terminals 3-3' of a so called supply bridge. From this supply bridge a supply current is fed to the subscriber's line which serves to feed the subscriber's set.

The supply bridge comprises in a conventional manner a transformer 15 having the windings 15-1, 15-2 and 15-3, a blocking capacitor 16 and the supply resistors 17 and 17' which are connected to the central battery.

The resistors 17 and 17' have a value of approximately 400 ohms and a current of approximately 20 to 40 mA flows through the resistors, depending on the length of the subscriber's line.

The current through the resistors 17 and 17' is detected by means of a supply current detector 18. The input terminals 18-1 and 18-2 are connected through the resistors 19 and 20 and 19' and 20' across the resistors 17 and 17'. The voltages across the resistors 17 and 17' which are a result of a circulating loop current furnish contributions at the input of detector 18 which can be added together. Currents which are a result of so-called longitudinal interferences produce input voltages on detector 18 which can be subtracted from one another. Consequently, detector 18 is insensitive to longitudinal currents.

If the subscriber's loop is closed then a given voltage exists between the input terminals of amplifier 18. If the loop is interrupted then this voltage is reduced to substantially zero. When applying a small "off"-set for which a "junction"-voltage is sufficient an operational amplifier can be used here as polarity detector. The signal at output 18-3 indicates whether an open-loop or closed-loop is detected.

Normally detector 18 will detect a closed-loop after a connection to the calling subscriber's line has been effected.

During the further call set-up detector 18 continues to supervise the calling subscriber. If the subscriber places the receiver on the hook this is detected by detector 18 and the latter initiates the interruption of the connection.

So far the description has described the normal operation of detectors 11 and 18.

Now the situation will be considered in which a fuse is blown owing to the occurrence of overvoltages.

If one of the fuses 5 or 6 is put out of operation the voltage of input terminal 11-1 of amplifier 11 increases in such a way that the polarity of the voltage between the input terminals reverses. In this case detector 11 detects a call. This call is processed by the telephone exchange as a normal call.

In the supply bridge detector 18 however detects no closed-loop as this requires a low-ohmic path from the a-wire to the b-wire which is not present in this case.

Detector 18 will then initiate the interruption of the connection to the subscriber's line.

After the connection has been interrupted loop-detector 11 detects a call again, whereafter a connection to a supply bridge is built up again etc.

The continuous switching from the state: call (as detected by 11) and the state: open-loop (as detected by 18) forms a strong indication of an interruption in a fuse. The relevant subscriber's line can then be placed in the parking condition whereafter a local investigation can be instituted or a remote test can be effected by means of a special test connection.

If one of the fuses 5' or 6' is blown then the voltage at input terminal 11-2 of amplifier 11 decreases in such a way that the polarity of the voltage between the input terminals reverses. Then amplifier 11 detects a call whereafter the fact that fuse 5' or 6' is defective is signalled in the same manner as for the fuses 5 and 6.

Figure 2:
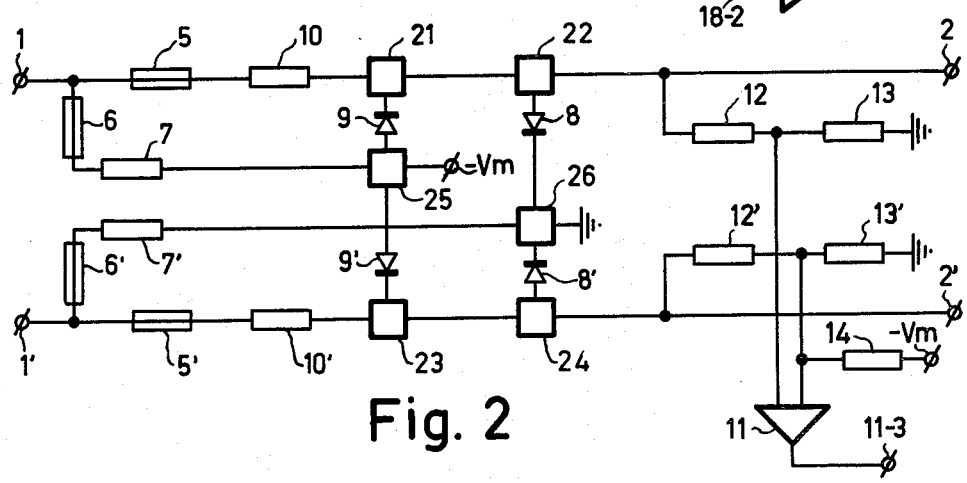
FIG. 2 is a diagram of a variant of a connecting circiut for use in the system according to FIG. 1.

FIG. 2 shows in which manner signalling the fact that a fuse is defective can be extended to the limiting diodes.

In FIG. 2 references 21, 22, 23, 24, 25 and 26 indicate conductors which are formed by locally metallizing crystal surfaces. The semiconductor diodes formed in the crystal are disposed between these metallized areas.

Owing to the indicated manner of connection of the diodes to the wires of the subscriber's line wherein the wire continues in all cases through the metallized areas (21, 22, 23, 24) an interruption of the telephone line is obtained when the metallized area is not connected or when it is open itself.

By connecting the battery voltage through the metallized areas 25 and 26 of the limiting diodes to the resistors 7 and 7' also these metallized areas can be supervised.

Figure 3:
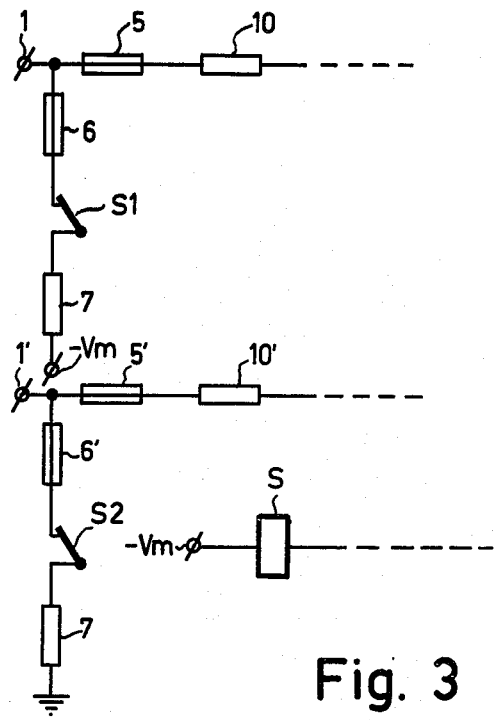
FIG. 3 shows an alternative manner for fitting the resistors in the line circuit.

In the FIGS. 1 and 2 the resistors 7 and 7' must be high-ohmic (40 k Ohm) to produce a small transmission attenuation. However, the resistors may also be low-ohemic (1 to 2 k Ohm) if the break contacts of a separating relay are included in the circuits of the resistors 7 and 7'. The separating relay S, FIG. 3, is energized after connection of the subscriber's line to a supply bridge and then disconnects the resistors from the line by means of the contacts s1 and s2.

Figure 4:
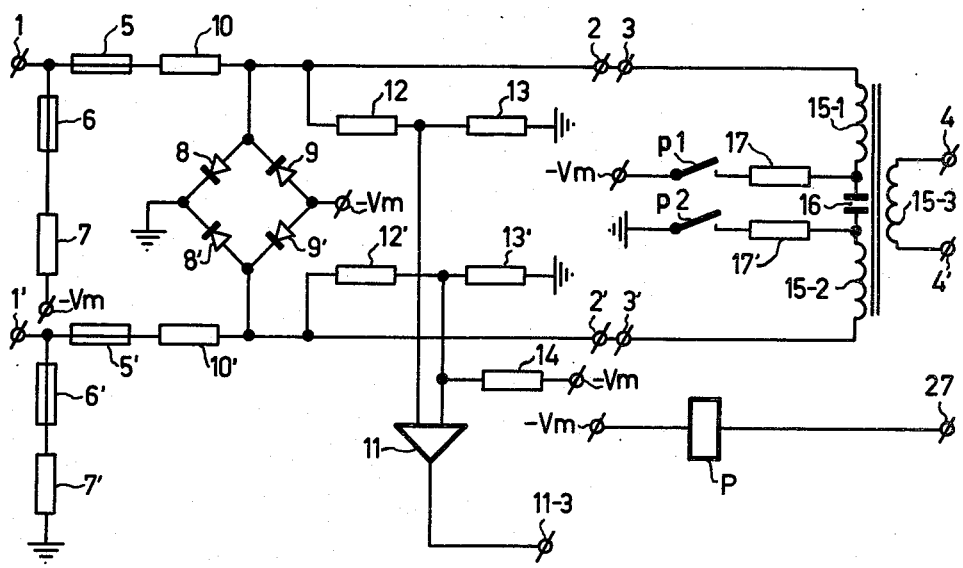
FIG. 4 is a diagram of a variant according to the invention.

In the system shown in FIG. 4 the terminals 2-2' of the connection circuit are directly connected to the terminals 3-3' of the supply bridge. Here the supply bridge is added individually to the relevant subscriber. The terminals 4-4' are here connected to an input of the switching network (not shown).

A separate detector such as detector 18 of FIG. 1 is not found in the supply bridge shown in FIG. 4. The function of detector 18 is here taken over by detector 11. Detector 11 has a dual function, namely detecting calls and, during the call, supervising the subscriber's line.

The supply bridge shown in FIG. 4 deviates still further from that shown in FIG. 1 by the presence of a pair of switching contacts p1 and p2 of a relay P. These contacts are used to separate, in the quiescent state, the supply resistors 17 and 17' from the central battery. The relay P is energized and the contacts p1 and p2 are closed if, after a call, a connection is effected between the terminals 4-4' of the supply bridge and a connection circuit of the telephone exchange.

In the case of a defective fuse detector 11 will detect a call and the telephone exchange will effect a connection to the terminals 4-4'. At the same time the relay P is energized by connecting terminal 27 to earth. Now both wires of the subscriber's line are supplied through the resistors 17 and 17' and detector 11 will detect the open-loop state. Then the telephone exchange will break the connection to the supply bridge and cancel the excitation of relay P. Thereafter detector 11 detects a call again and thereafter, after energizing relay P, the state: open-loop.

Hunting of detector 11 between these two states is the indication that a fuse is defective.

The relay P in FIG. 4 and the switching network SWN in FIG. 1 constitute switching means for connecting the subscriber's line to a (low-ohmic) supply which is operative during the conversation.

The supply through the resistors 7 and 7' forms the rest supply of the subscriber's line. This supply takes place at the outside relative to the position of the overvoltage protecting means. The low-ohmic supply from the supply bridge takes place at the inside.

The disappearance of the outside supply of the subscriber's line when an overvoltage protector becomes defective so that a call is detected and the subsequent switch-on of the inside supply so that open-loop is detected here offers the possibility to detect the defective fuse.

What is claimed is:

1. A signalling system for a telephone device comprising a central battery, telephone lines of a subscriber loop, rest supply resistors connected in series with said battery and connected to said telephone lines, overvoltage protection means connected in series with the battery and rest supply resistors for providing an open circuit in response to over-voltage conditions, a supply bridge means for selectively providing an alternate connection between said central battery and said telephone lines, sensing means for providing a loop detection signal in response to a closed-loop condition of said subscriber loop and for providing a bridge signal in response to said alternate connection only if said subscriber loop is in the closed-loop condition, said sensing means further providing said loop detection signal in response to an open circuit of said voltage protection means, and switching network means for initiating the alternate connection in response to said loop detection signal and for removing said alternate connection if said alternate connection is initiated and said bridge signal is not provided, said switching means maintaining said alternate connection in response to a bridge signal following said loop detection signal, whereby in response to the open circuit of the over-voltage protection means said sensing means alternately provides and removes said loop detection signal thereby signalling the open circuit condition of said over-voltage protection means.

2. A circuit as claimed in claim 1, further comprising limiting diodes coupled to wires of the telephone lines respectively, each having a metallized area of a crystal surface coupled to the wire.

3. A circuit as claimed in claim 2, wherein the battery voltage is supplied through the metallized area of the crystal surface of the limiting diodes to the rest supply resistors respectively.

* * * * *